United States Patent [19]
Kubo et al.

[11] Patent Number: 5,965,659
[45] Date of Patent: *Oct. 12, 1999

[54] FLUORINE-CONTAINING-OIL-IN-WATER EMULSION AND SURFACE TREATMENT COMPOSITION

[75] Inventors: Motonobu Kubo; Masamichi Morita; Norimasa Uesugi, all of Osaka, Japan

[73] Assignee: Daikin Industries Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/669,288

[22] PCT Filed: Dec. 22, 1994

[86] PCT No.: PCT/JP94/02179

§ 371 Date: Jun. 28, 1996

§ 102(e) Date: Jun. 28, 1996

[87] PCT Pub. No.: WO95/18194

PCT Pub. Date: Jul. 6, 1995

[30] Foreign Application Priority Data

Dec. 29, 1993 [JP] Japan .................................... 5-351038

[51] Int. Cl.$^6$ ..................................................... C08J 29/04
[52] U.S. Cl. ............................................ 524/504; 524/505
[58] Field of Search ...................................... 524/504, 505

[56] References Cited

U.S. PATENT DOCUMENTS

| 3,574,791 | 4/1971 | Sherman et al. . |
| 5,370,919 | 12/1994 | Fieuws et al. . |

FOREIGN PATENT DOCUMENTS

| 52-106386 | 9/1977 | Japan . |
| 60-034730 | 2/1985 | Japan . |
| 62-292713 | 12/1987 | Japan . |
| 63-002916 | 1/1988 | Japan . |
| 50844 | 2/1989 | Japan . |
| 2147601 | 6/1990 | Japan . |
| 5017538 | 1/1993 | Japan . |

*Primary Examiner*—Peter D. Mulcahy
*Attorney, Agent, or Firm*—Birch, Stewart, Kolasch & Birch, LLP

[57] ABSTRACT

A surface treatment composition containing a fluorine-containing-oil-in-water emulsion prepared by emulsifying a fluorine-containing oil in water in the presence of a polymeric surfactant of a graft copolymer or block copolymer having a fluorine-containing segment and a hydrophilic segment in a molecule is an emulsion having a very excellent stability, which is superior in initial water- and oil-repellency and abrasion resistance of the water- and oil-repellency, and gives a good feeling.

5 Claims, No Drawings

FLUORINE-CONTAINING-OIL-IN-WATER EMULSION AND SURFACE TREATMENT COMPOSITION

FIELD OF THE INVENTION

The present invention relates to a fluorine-containing-oil-in-water emulsion comprising a polymeric surfactant, and a fluorine-containing-oil-in-water surface treatment composition comprising said emulsion. The surface treatment composition of the present invention can be suitably used as a textile treatment agent.

RELATED ART

Since a fluorine-containing oil such as a perfluoropolyether, a polychlrotrifluorostyrene and fluorocarbon can give a good feeling and a high water- and oil-repellency, it is frequently diluted with a fluorine-containing solvent to be used as a textile treatment agent.

However, recently, the solvent has been frequently substituted with water, in view of a fire and an environmental pollution, and a technique comprising dispersing a fluorine-containing oil in water for preparing a fluorine-containing oil emulsion has been required. For example, Japanese Patent Kokoku Publication No. 45616/1988 proposes to disperse a perfluoropolyether in water in the presence of a fluorine-containing surfactant, a hydrocarbon surfactant and a hydrophilic solvent. However, this proposal had a problem in view of the stability of the emulsion.

SUMMARY OF THE INVENTION

An object of the present invention is to provide a surface treatment composition comprising a fluorine-containing-oil-in-water emulsion prepared by emulsifying a fluorine-containing oil and water, which composition is superior in stability.

Another object of the present invention is to provide a surface treatment composition having excellent initial water- and oil-repellency, abrasion resistance of the water- and oil-repellency and feeling, which composition can be used as a textile treatment agent.

The present invention provides a fluorine-containing-oil-in-water emulsion prepared by emulsifying a fluorine-containing oil in water in the presence of a polymeric surfactant of a graft copolymer or block copolymer having a fluorine-containing segment and a hydrophilic segment in a molecule.

The present invention also provides a surface treatment composition comprising said emulsion.

DETAILED DESCRIPTION OF THE INVENTION

The fluorine-containing segment in the polymeric surfactant in the present invention preferably comprises a perfluoropolyether group or a polymeric chain prepared by polymerizing a fluorine-containing monomer having at least one fluorine-containing group selected from the group consisting of a polyfluoroalkyl group, a polyfluoroalkenyl group and a perfluoropolyether group.

The hydrophilic segment preferably comprises a polyalkylene oxide group or a polymeric chain prepared by polymerizing a polyalkylene glycol (meth)acrylate.

The graft copolymer can be prepared by polymerizing a fluorine-containing monomer with a polyalkylene glycol (meth)acrylate. The block copolymer can be prepared by polymerizing a fluorine-containing monomer or a perfluoropolyether group with a polyalkylene glycol (meth)acrylate or an alkylene oxide.

A weight ratio of the fluorine-containing segment to the hydrophilic segment is usually from 5:95 to 95:5, preferably from 20:80 to 80:20.

In the graft copolymer, the fluorine-containing segment comprises a polymer of the fluorine-containing monomer, and the hydrophilic segment comprises a polymer of the polyalkylene glycol (meth)acrylate.

In the graft copolymer, it is preferred that the fluorine-containing segment constitutes a main chain and the hydrophilic segment constitutes a side chain.

In order to polymerize the graft copolymer, the fluorine-containing monomer and polyalkylene glycol (meth)acrylate are used. Preferably, the polymerization is a solution polymerization. Examples of a solvent for the polymerization include ethyl alcohol, isopropyl alcohol, dipropylene glycol, dipropylene glycol monomethyl ether and the like.

The fluorine-containing monomer is a monomer having at least one of a polyfluoroalkyl group, a polyfluoroalkenyl group and a perfluoropolyether group.

Examples of the monomer having the polyfluoroalkyl group, the polyfluoroalkenyl group or the perfluoropolyether group include the following (meth)acrylates:

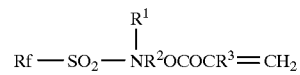     (A1)

     (A2)

     (A3)

     (A4)

     (A5)

     (A6)

     (A7)

wherein Rf is a polyfluoroalkyl or polyfluoroalkenyl group having 3 to 21 carbon atoms or a perfluoropolyether group having a number average molecular weight of 500 to 5,000 (measured by $^{19}$F-NMR); $R^1$ is a hydrogen atom or an alkyl group having 1 to 10 carbon atoms; $R^2$ is an alkylene group having 1 to 10 carbon atoms; $R^3$ is a hydrogen atom or a methyl group; Ar is an arylene group which may has a substituent group; and n is an integer of 1 to 10. The perfluoroether group may be represented by the formula:

(wherein n is 3 to 30),

(wherein n is 2 to 30 and m is 3 to 70), $$CF_3O(CF_2CF_2O)_n(CF_2O)_mCF_2-$$

(wherein n is 2 to 40 and m is 4 to 70) or $$F(CF_2CF_2CF_2O)_nCF_2CF_2-$$

(wherein n is 3 to 30).

Specific examples of the monomer include the followings:

$$CF_3(CF_2)_7(CH_2)OCOCH=CH_2,$$

$$CF_3(CF_2)_6(CH_2)OCOCCH_3=CH_2,$$

$$(CF_3)_2CF(CF_2)_6(CH_2)_2OCOC(CH_3)=CH_2,$$

$$CF_3(CF_2)_7(CH_2)_2OCO(CH_3)=CH_2,$$

$$CF_3(CF_2)_7(CH_2)_2OCOCH=CH_2,$$

$$CF_3(CF_2)_7SO_2N(CH_3)(CH_2)_2OCOCH=CH_2,$$

$$CF_3(CF_2)_7SO_2N(C_2H_5)(CH_2)_2OCOC(CH_3)=CH_2,$$

$$(CF_3)_2CF(CF_2)_6CH_2CH(OCOCH_3)CH_2OCOC(CH_3)=CH_2,$$

$$(CF_3)_2CF(CF_2)_6CH_2CH(OH)CH_2OCOCH=CH_2,$$

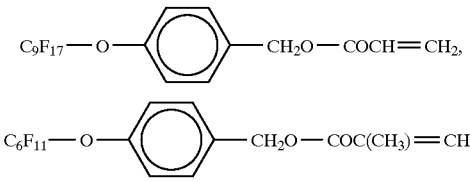

$$F(CF(CF_3)CF_2O)_{10}CF_2CF_2-COOCH_2CH_2CH=CH_2.$$

The polyalkylene glycol (meth)acrylate is, for example, a compound represented by the formula:

$$CH_2=CR^5COO-(R^6-O)_n-R^7$$

(wherein $R^5$ and $R^7$ are a hydrogen atom or a methyl group; $R^6$ is an alkylene group having 2 to 6 carbon atoms; and n is an integer of 3 to 50).

$R^6$ is preferably $-CH_2CH_2-$, but may be

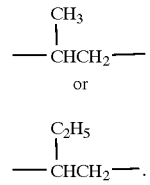

In the present invention, the polyethylene glycol acrylate or methacrylate wherein $R^6$ is $-CH_2CH_2-$ is preferably used. In addition, n is selected from an integer of 3 to 50, but particularly good results can be obtained when n is selected from an integer of 9 to 25. The polyalkylene glycol (meth)acrylate may be in the form of a mixture of two or more compounds which are different in $R^6$ and n.

In the block copolymer, the fluorine-containing segment comprises a polymer of a fluorine-containing monomer or a perfluoropolyether group, and the hydrophilic segment comprises a polymer of a polyalkylene glycol (meth)acrylate or a polyalkylene oxide group.

In the block copolymer, examples of arrangement of the fluorine-containing segment (F segment) and the hydrophilic segment (H segment) include FH, FHF, HFH, FHFHF, HFHFH and the like. Among them, FH, FHF and HFH are preferred in view of the stability of the emulsion.

When synthesizing a block copolymer wherein the fluorien-containing segment comprises the polymer of the fluorine-containing monomer, the same fluorine-containing monomer as that in the graft copolymer can be used. A typical method of synthesizing the block copolymer used in the present invention will be described below. According to the synthesis method of a FHF type block copolymer described in Japanese Patent Kokai Publication No. 43955/1977 (corresponding to U.S. Pat. No. 3,574,791, the disclosure of which is incorporated herein), a FHF type block copolymer:

$$H(FP)_pS[CH_2C(CH_3)HCOO(R^8O)_nCOC(CH_3)HCH_2S]_m(FP)_pH$$

(wherein $R^8$ is an alkylene group having 2 to 6 carbon atoms; FP is a fluorine-containing monomer; and p is an integer of at least 2) is obtained by solution-polymerizing a fluorine-containing monomer with the following polyethylene glycol dimethacrylate-$H_2S$ prepolymer:

$$HS[CH_2C(CH_3)HCOO(R^8O)_nCOC(CH_3)HCH_2S]_mH$$

(wherein $R^8$ is an alkylene group having 2 to 6 carbon atoms; n is an integer of 3 to 50; and m is an integer of 1 to 100). According to a modified method from the method of J. Wang et al. [J. Polymer Sci., Part A, 30, 2251 (1992)], a FH type block copolymer is obtained by living-anion-polymerizing a fluorine-containing monomer with ethylene oxide in the presence of a diphenyl methyl potassium initiator.

In the block copolymer wherein the fluorine-containing segment comprises a perfluoropolyether group, the perfluoropolyether group may be $$F(CF(CF_3)CF_2O)_nCF_2CF_2-$$

(wherein n is 3 to 30), $$CF_3O(CF(CF_3)CF_2O)_n(CF_2O)_mCF_2-$$

(wherein n is 2 to 30 and m is 3 to 70), $$CF_3O(CF_2CF_2O)_n(CF_2O)_mCF_2-$$

(wherein n is 2 to 40 and m is 4 to 70), or $$F(CF_2CF_2CF_2O)_nCF_2CF_2-$$

(wherein n is 3 to 30).

A weight average molecular weight of the perfluoropolyether group which is suitable for using in the present invention is from 500 to 5,000 (measured by $^{19}$F-NMR).

Examples of the method of synthesizing the block copolymer include an iodine transfer polymerization process wherein a polyalkylene (meth)acrylate is polymerized with a perfluoropolyether having an iodine atom at one molecular end [Kobunshi Ronbunshu, 49 (10), 765 (1992)] [M. Oka and M. Tatemoto, "Contemporary Topics in Polymer Science", Vol. 4, Plenum Press, New York, N.Y. (1984), p763, the disclosure of which is incorporated herein)], a process wherein an alkylene (meth)acrylate is polymerized in the presence of an initiator (for example, perfluoro-oxa-alkanoylperoxide) so that a perfluoropolyether group is introduced at both ends of polyalkylene (meth)acrylate chain, and the like.

When synthesizing a block copolymer wherein the hydrophilic segment comprises the polymer of the polyalkylene glycol (meth)acrylate, the same polyalkylene glycol (meth) acrylate as that in the graft copolymer can be used.

In the block copolymer wherein the hydrophilic segment comprises a polyalkylene oxide group, the alkylene oxide group may be ethylene oxide, propylene oxide and the like.

As the constituent monomer for polymerizing the graft copolymer or block copolymer, other monomers may be contained, in addition to the above-described fluorine-containing monomer, perfluoropolyether, polyalkylene glycol (meth)acrylate and alkylene oxide. Examples of the other monomer include vinyl monomers such as alkyl (meth) acrylate, ethylene, vinyl acetate, vinyl chloride, vinylidene halide, acrylonitrile, styrene, (meth)acrylamide, N-methylol (meth)acrylamide, hydroxyalkyl (meth)acrylate, vinyl alkyl ether, butadiene, isoprene, chloroprene, glycidyl (meth) acrylate and the like. An amount of the other monomer is not more than 50% by weight of the graft copolymer or block copolymer. When the amount exceeds 50% by weight, the stability of the emulsion is liable to become inferior.

A molecular weight of the graft copolymer or block copolymer is from 1,000 to 400,000. Particularly, those having the molecular weight of 10,000 to 200,000 are preferred.

The polymeric surfactant of the present invention is preferable because the fluorine-containing segment and the hydrophilic segment in the polymer are block segments so that the action of each segment is clarified. Specifically, it is believed that the blocked hydrophilic segment gives a strong steric hindrance force among the fluorine-containing oil particles so as to prevent the aggregation of particles. It is also believed that since the adsorption amount to an interface is increased, the strength of interface film is increased so as to prevent the cohesion of the particles. A stable fluorine-containing-oil-in-water emulsion can be prepared in smaller amount of the block or graft copolymer than the amount of a random copolymer.

The emulsion of the present invention comprises the polymeric surfactant, the fluorine-containing oil and water.

A weight ratio of water to the fluorine-containing oil in the emulsion is usually from 95:5 to 50:50, preferably from 80:20 to 50:50. An amount of the polymeric surfactant is usually from 0.1 to 20 parts by weight, based on 100 parts by weight of the fluorine-containing oil.

The polymeric surfactant in the present invention exhibits a better soil release property when the proportion of the polymeric surfactant is increased. When used for the application which requires the soil release property, the polymeric surfactant may be usually used in an amount of not more than 900 parts by weight, preferably from 200 to 900 parts by weight, more preferably from 500 to 900 parts by weight, based on 100 parts by weight of the fluorine-containing oil.

The fluorine-containing oil is a liquid at a room temperature and examples thereof include a fluorocarbon, a perfluoropolyether or an oligomer of ethylene trifluoride chloride.

Specific examples of the fluorocarbon are perfluorodecalin, perfluoromethyidecalin, perfluorotributylamine, perfluoropropylamine, perfluorohexane, perfluorooctane and the like.

The perfluoropolyether may be commercially available one and specific examples thereof are:

$F(CF(CF_3)CF_2O)_nCF_2CF_3$ (KRYTOX manufactured by Dupont), $CF_3O(CF(CF_3)CF_2O)_n(CF_2O)_mCF_3$ (FOMBLIN Y manufactured by Montefluos), $CF_3O(CF_2CF_2O)_n(CF_2O)_mCF_3$ (FOMBLIN Z manufactured by Montefluos), $F(CF_2CF_2CF_2O)_nCF_2OF_3$ (DEMNUM manufactured by Daikin Industries Ltd.), and the like. A number average molecular weight of the perfluoropolyether which is suitable for the present invention is preferably from 1,000 to 10,000 (measured by $^{19}$F-NMR).

Examples of the oligomer of ethylene trifluoride chloride include: $Cl(CF_2CFCl)_nCl$ (DAIFLOIL manufactured by Daikin Industries Ltd.). A number average molecular weight of the oligomer of ethylene trifluoride chloride which is suitable for the present invention is preferably from 500 to 15,000 (measured by $^{19}$F-NMR).

The fluorine-containing oil may have a functional group at the molecular end. Specific examples of the functional group in the fluorine-containing oil include a hydroxyl group, a carboxyl group, an amino group, an ester group, an amide group and the like.

The emulsion can be prepared by dissolving the graft copolymer or block copolymer in water, then adding the fluorine-containing oil and emulsifying the mixture by a usual mixer, a colloid mill, an ultrasonic homogenizer, a high pressure homogenizer and the like. The good fluorine-containing oil emulsion can be easily obtained by the use of an emulsifying apparatus giving the strong shear energy such as a ultrasonic homogenizer and a high pressure homogenizer.

The surface treatment composition of the present invention as such may be used as the surface treatment agent. Alternatively, other surface treatment agent (for example, a repellent such as an emulsion repellent) may be used together with the surface treatment composition of the present invention. The emulsion repellent comprises a water- and oil-repellent component (for example, a water- and oil-repellent fluorine-containing copolymer), water and a water-soluble organic solvent. The water- and oil-repellent fluorine-containing copolymer contains, for example, a polyfluoroalkyl (meth)acrylate/alkyl (meth)acrylate copolymer; or a mixture thereof with a cross-linkable polymerizable compound. Specific examples of the water-soluble organic solvent include acetone, ethanol, methanol, ethylene glycol, propylene glycol, dipropylene glycol monomethyl ether and the like. A weight ratio of the fluorine-containing oil in the surface treatment composition to the water- and oil-repellent component in the emulsion repellent is preferably from 10:90 to 90:10.

When the surface treatment composition of the present invention is used as the textile treatment agent, the surface treatment composition can be adhered to a surface of a substance to be treated by a known coating method such as a dip coating and the like. If necessary, it may be applied together with an appropriate crosslinking agent to conduct the curing. The textile treatment agent of the present invention may be used alone after diluting with water. It is also possible to use in combination with other chemicals such as insect repellents, antistatic agents, flame retardants, dye fixing agents, wrinkle inhibitors, and the like.

Examples of a fiber treated with the textile treatment agent of the present invention include animal- or vegetable-origin natural fibers such as cotton, hemp, wool and silk; synthetic fibers such as polyamide, polyester, polyvinyl alcohol, polyacrylonitrile, polyvinyl chloride, polypropylene; semisynthetic fibers such as rayon and acetate; and a mixture of these fibers. The textile formed from these fibers (for example, a yarn and a fabric) may be treated.

The surface treatment composition of the present invention can also be used as a mold release agent, a lubricant, a stain proof agent, an anti-fogging agent, a paint additive, an ink additive, a paper treatment agent, a sizing agent, a resin adhesion inhibitor, an oil barrier, an anti-blocking agent, a cosmetic and a glazing agent by making use of physical properties of the fluorine-containing oil, in addition to the textile treatment agent.

PREFERRED EMBODIMENT OF THE INVENTION

The present invention will be illustrated by the following Preparative Examples and Examples which do not limit the present invention.

The water repellency and the oil repellency are shown according to the following criteria. The water repellency is expressed by the water repellency No. (see Table 1) determined by the spray method according to JIS (Japanese Industrial Standard) L-1005. The oil repellency is determined by dropping several drops (diameter: about 4 mm) of a test solution shown in AATCC-TM-118-1966 (see Table 2) on two positions of a surface of a test cloth and observing the penetration state of drops after 30 seconds. The superscript "+" or "−" to the water repellency No. and the oil repellency represents that the result is slightly better and slightly worse than said repellency No. and said oil repellency, respectively.

The soil release property (SR property) was evaluated as follows.

A test cloth is spread out on a horizontally spread absorbent blotting paper, and five drops of a dirty motor oil (SAE 20W-40, discharged one after traveling for a distance of 4000 kg by a small car) are dropped. A polyethylene sheet is laid thereon and a weight of 2 kg was placed. After removing the weight and polyethylene sheet 60 seconds later, an excess oil is wiped. After standing at room temperature for one hour, the test cloth and a ballast cloth (total weight: 1 kg) are treated at 50° C. for 10 minutes using an electric washing machine [detergent: 60 g of BLUE DIA (trade name) manufactured by Kao Co., bath volume: 35 L], rinsed and then air-dried. The state of the remained stain on the dried test cloth is compared with that of a standard photographic plate for criterion and expressed by the corresponding criterion class (see Table 3). As the standard photographic plate for criterion, a photographic plate of AATCC Test Method 130-1970 was used.

TABLE 1

| Water repellency No. | State |
|---|---|
| 100 | No wet on the surface |
| 90 | Slight wet on the surface |
| 80 | Partial wet on the surface |
| 70 | Wet on the surface |
| 50 | Wet over the whole surface |
| 0 | Complete wet on the front and back surfaces |

TABLE 2

| Oil repellency | Test solution | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol (35/65 parts by weight) | 29.6 |

TABLE 2-continued

| Oil repellency | Test solution | Surface tension (dyne/cm, 25° C.) |
|---|---|---|
| 1 | Nujol | 31.2 |
| 0 | Inferior to 1 | — |

TABLE 3

| Class | Criterion |
|---|---|
| 1 | Remarkable stain remained |
| 2 | Considerable stain remained |
| 3 | Slight stain remained |
| 4 | Little stain remained |
| 5 | No stain remained |

Firstly, the Preparative Examples and Examples wherein a graft copolymer is used as a surfactant are shown.

PREPARATIVE EXAMPLE 1

(Preparation of graft copolymer wherein fluorine-containing monomer is polyfluoroalkyl group-containing monomer)

In a four-necked flask with a reflux condenser, a nitrogen introducing tub, a thermometer and a stirrer, 25 g of $CH_2=CHCOO(CH_2)_2(CF_2CF_2)_nCF_2CF_3$ (FA, a mixture of compounds in which n is 3, 4 and 5 in a weight ratio of 5:3:1), 65 g of $CH_2=CHCOO(CH_2CH_2O)_nH$ (BLENMER PE-350 manufactured by Nippon Oil & Fats Company, n is from 7 to 9), 400 g of isopropanol and 0.1 g of n-laurylmercaptane were charged and heated to 60° C. Then, the atmosphere in the flask was replaced with a nitrogen gas for 30 minutes. One gram of azobisisobutylamidinate salt was added and the copolymerization reaction was conducted with stirring for 6 hours to give a graft copolymer. A gas chromatography analysis revealed that at least 99% of monomers were polymerized. A polymer concentration was 18% by weight. A molecular weight of the resultant graft copolymer was measured by GPC to reveal that the weight average molecular weight was 20,000 (in terms of polystyrene). In the graft copolymer, a polymer of FA formed a main chain and a polymer of BLENMER PE-350 formed a side chain.

PREPARATIVE EXAMPLE 2

(Preparation of graft copolymer wherein fluorine-containing monomer is perfluoropolyether group-containing monomer)

According to the same manner as in described in Preparative Example 1 except that $CH_2=CHCOO(CH_2)_2OCO-CF(CF_3)(OCF_2CF(CF_3))_3OCF_2CF_2CF_3$ was substituted for FA, the reaction was conducted to give a graft copolymer. A gas chromatography analysis revealed that at least 99% of monomers were polymerized. A polymer concentration was 18% by weight. A molecular weight of the resultant graft copolymer was measured by GPC to reveal that the weight average molecular weight was 30,000 (in terms of polystyrene).

EXAMPLES 1 AND 2

425.3 g of water, 108 g of perfluoropolyether (DEMNUM S-20 manufactured by Daikin Industries Ltd., a molecular weight: 2,500) and 66.7 g (polymer: 12 g) of a graft copolymer solution prepared in Preparative Example 1 (Example 1) or Preparative Example 2 (Example 2) were treated with an ultrasonic homogenizer for 5 minutes to prepare an emulsion. The stability of the emulsion is shown in Table 4.

EXAMPLE 3

97.3 g of water, 36 g of perfluoropolyether (DEMNUM S-20 manufactured by Daikin Industries Ltd., a molecular weight: 2,500) and 466.7 g (polymer: 84 g) of a graft copolymer solution prepared in Preparative Example 1 were treated with an ultrasonic homogenizer for 5 minutes to prepare an emulsion. The stability of the emulsion is shown in Table 4.

COMPARATIVE EXAMPLE 1

According to the same manner as in described in Example 1 except that polyoxyethylene (20) octylphenyl ether (HS-220 manufactured by Nippon Oil & Fats Company) was substituted for the graft copolymer, an emulsion was obtained. The stability of the emulsion is shown in Table 4.

Emulsion Repellent

A mixture of 40 g of stearyl acrylate (StA), 60 g of FA, 175 g of deionized water, 0.1 g of n-laurylmercaptane, 1 g of stearyltrimethylammonium chloride and 2 g of polyoxyethyleneoctylphenyl ether was heated to 60° C. and emulsified by using a high pressure homogenizer. The resultant emulsion was charged in a four-necked flask equipped with a reflux condenser, a nitrogen introducing tube, a thermometer and a stirrer and, after maintaining in a nitrogen flow at 60° C. for about one hour and stirring sufficiently, an aqueous solution of 0.5 g of azobisisobutylamidine diacetate salt in 5 g of water was added to initiate the polymerization. The mixture was heated with stirring at 60° C. for 3 hours to give a latex StA/FA copolymer. A gas chromatography analysis revealed that at least 99% of monomers were polymerized. A polymer concentration was 35% by weight.

TABLE 5

| Emulsion Surfactant | Example 1 Preparative Example 1 | | Example 2 Preparative Example 2 | | Comparative Example 1 HS-220 | |
|---|---|---|---|---|---|---|
| Amount of emulsion (g) | Water-repellency/ oil-repellency | Feeling | Water-repellency/ oil-repellency | Feeling | Water-repellency/ oil-repellency | Feeling |
| 0  | 50/0   | Slightly hard | 50/0  | Slightly hard | 50/0  | Slightly hard |
| 10 | 90+/6  | Soft | 80+/4 | Soft | 70/1  | Soft |
| 20 | 100/7  | Soft | 90/5  | Soft | 70+/2 | Soft |
| 30 | 100+/8 | Soft | 90+/6 | Soft | 80/3  | Soft |

TABLE 4

| Example | 1 | 2 | 3 | Comparative Example 1 |
|---|---|---|---|---|
| Surfactant | Preparative Example 1 | Preparative Example 2 | Preparative Example 1 | HS-220 |
| Weight ratio of surfactant to DEMNUM S-20 | 1/9 | 1/9 | 7/3 | 1/9 |
| Immediately after emulsification | ⊚ | ⊚ | ⊚ | Δ |
| After one month at 40° C. | ⊚ | ⊚ | ⊚ | XX |

State of emulsion
⊚: Very good;
○: Good;
Δ: Fair
X: Slight separation;
XX: Full separation

EXAMPLE 4

A given amount of emulsions of Examples 1 and 2 and Comparative Example 1 were added to 500 g (solid content: 0.1% by weight) of a diluted liquid of the following emulsion repellent to give a resin liquid. A mixed fabric (polyester/cotton=65/35) was immersed in the resin liquid, squeezed with a mangle and then predried at 80° C. for 3 minutes. After the mixed fabric was heat-treated at 150° C. for 3 minutes, the water-repellency, oil-repellency and feeling (sensual evaluation) were evaluated. The results are shown in Table 5.

EXAMPLE 5

A nylon (taffeta) fabric was immersed in a diluted liquid (solid content: 1% by weight) of an emulsion repellent used in Example 4, dried at 110° C. for 3 minutes and cured at 160° C. for 3 minutes. On the other hand, the emulsion prepared in Example 1 was diluted to a solid content of 1% by weight, and the fabric treated with the emulsion repellent was immersed in the diluted liquid, air-dried and cured at 110° C. for 3 minutes. Initial water- and oil-repellency and water- and oil-repellency after abrasion of the fabric treated by the two steps of treatment were evaluated. The abrasion was conducted by abrading the treated fabric with an abrading white cotton fabric wetted with water under a load of 2.5 kg in the given times of abrasion by the use of plain plane abrasion tester (manufactured by Yamaguchi Kagaku Sangyo Kabushiki Kaisha). Once of the abrasion is once of reciprocation (speed: 1 reciprocation/second). The results are shown in Table 6.

TABLE 6

| | Water-repellency/ oil-repellency | | | |
|---|---|---|---|---|
| Times of abrasion | 0 | 10 | 50 | 100 |
| Treatment with only emulsion repellent | 70+/3 | 70/2 | 50/1 | 0/0 |
| Two-step treatment with emulsion repellent and perfluoropolyether emulsion | 80+/4 | 80/4 | 70+/3 | 70/2 |

EXAMPLE 6

100 g (solid content: 20% by weight) of each of emulsions prepared in Example 1 [a weight ratio of surfactant (Preparative Example 1) to DEMNUM S-20 is 1:9] and Example 3 [a weight ratio of surfactant (Preparative Example 1) to DEMNUM S-20 is 7:3] was diluted with water (20-fold dilution). A mixed fabric (polyester/cotton=65/35) was immersed in the diluted liquid of the emulsion, squeezed with a mangle and then predried at 80° C. for 3 minutes. After the mixed fabric was heat-treated at 150° C. for 3 minutes, the water-repellency, oil-repellency, feeling (sensual evaluation) and soil release property (SR property) were evaluated. The results are shown in Table 7.

TABLE 7

| Weight ratio of surfactant to DEMNUM S-20 | Water-repellency/ oil-repellency | Feeling | SR property |
|---|---|---|---|
| 1/9 | 60/2 | Soft | 3 |
| 7/3 | 90+/5 | Soft | 5 |

Next the Preparative Examples and Examples wherein in a block copolymer is used as a surfactant are shown.

PREPARATIVE EXAMPLE 3

(Preparation of block copolymer wherein fluorine-containing monomer is polyfluoroalkyl group-containing monomer)

In a four-necked flask with a reflux condenser, a nitrogen introducing tube, a thermometer and a stirrer, 2.5 g of FA, 2.5 g of a polyethylene glycol methacrylate-$H_2S$ prepolymer:

$$HS[CH_2C(CH_3)HCOO(CH_2CH_2O)_4COC(CH_3)HCH_2S]_{11}H,$$

15 g of methyl isobutyl ketone and 0.0075 g of t-butylhydroperoxide were charged and heated to 75° C. Then, the polymerization was conducted with stirring in a nitrogen atmosphere for 17 hours to give a block copolymer. A gas chromatography analysis revealed that at least 99% of monomers were polymerized. The block copolymer was used as the surfactant after precipitating with hexane and washing. A molecular weight of the resultant block copolymer was measured by GPC to reveal that the weight average molecular weight was 15,000 (in terms of polystyrene). The block copolymer was a FHF type (F: block formed from a polymer of FA, H: polyethylene glycol dimethacrylate-$H_2S$ prepolymer).

PREPARATIVE EXAMPLE 4

(Preparation of block copolymer wherein fluorine-containing monomer is perfluoropolyether group-containing monomer)

According to the same manner as that described in Preparative Example 3 except that $CH_2$=$CHCOO(CH_2)_2OCO$—$CF(CF_3)$ $(OCF_2CF(CF_3))_3OCF_2CF_2CF_3$  was substituted for FA, the reaction was conducted to give a block copolymer. A gas chromatography analysis revealed that at least 99% of monomers were polymerized. The block copolymer was used as the surfactant after precipitating with hexane and washing. A molecular weight of the resultant block copolymer was measured by GPC to reveal that the weight average molecular weight was 25,000 (in terms of polystyrene).

EXAMPLES 7 AND 8

480 g of water, 108 g of perfluoropolyether (DEMNUM S-20 manufactured by Daikin Industries Ltd., a molecular weight: 2,500) and 12 g (polymer: 12 g) of a block copolymer prepared in Preparative Example 3 or Preparative Example 4 were treated with an ultrasonic homogenizer for 5 minutes to prepare an emulsion.

COMPARATIVE EXAMPLE 2

According to the same manner as in described in Example 7 except that polyoxyethylene sorbitan monolaurate(LT-221 manufactured by Nippon Oil & Fats Company) was substituted for the block copolymer, the emulsification was conducted, and the stability after emulsification was evaluated. The results are shown in Table 8.

TABLE 8

|  | Example 7 | Example 8 | Comparative Example 2 |
|---|---|---|---|
| Surfactant | Preparative Example 3 | Preparative Example 4 | LT-221 |
| Weight ratio of surfactant to DEMNUM S-20 | 1/9 | 1/9 | 1/9 |
| Immediately after emulsification | ⊚ | ⊚ | XX |
| After one month at 40° C. | ⊚ | ⊚ | XX |

State of emulsion
⊚: Very good;
○: Good;
Δ: Fair
X: Slight separation;
XX: Full separation

EXAMPLE 9

A given amount of an emulsion prepared by the use of surfactants of Preparative Examples 3 and 4 and LT-221 (Comparative Example 2) was added to 500 g (solid content: 0.1% by weight) of a diluted liquid of an emulsion repellent which was the same as in Example 4 to give a resin liquid. A mixed fabric (polyester/cotton=65/35) was immersed in the resin liquid, squeezed with a mangle and then predried at 80° C. for 3 minutes. After the mixed fabric was heat-treated at 150° C. for 3 minutes, the water-repellency, oil-repellency and feeling (sensual evaluation) were evaluated. The results are shown in Table 9.

TABLE 9

| Emulsion Surfactant | Example 7 Preparative Example 3 | | Example 8 Preparative Example 4 | | Comparative Example 2 LT-221 | |
|---|---|---|---|---|---|---|
| Amount of emulsion (g) | Water-repellency/ oil-repellency | Feeling | Water-repellency/ oil-repellency | Feeling | Water-repellency/ oil-repellency | Feeling |
| 0 | 50+/0 | Slightly hard | 50+/0 | Slightly hard | 50+/0 | Slightly hard |
| 10 | 90/6 | Soft | 80/4 | Soft | 70/0 | Soft |

TABLE 9-continued

| Emulsion Surfactant | Example 7 Preparative Example 3 | | Example 8 Preparative Example 4 | | Comparative Example 2 LT-221 | |
|---|---|---|---|---|---|---|
| Amount of emulsion (g) | Water-repellency/ oil-repellency | Feeling | Water-repellency/ oil-repellency | Feeling | Water-repellency/ oil-repellency | Feeling |
| 20 | 90/7 | Soft | 90/4 | Soft | 70+/2 | Soft |
| 30 | 100+/8 | Soft | 90+/6 | Soft | 80/3 | Soft |

EFFECT OF THE INVENTION

A surface treatment composition of the present invention is formed from an emulsion, a stability of which is very good. When used as a textile treatment agent, the surface treatment composition is superior in initial water- and oil-repellency and abrasion resistance of the water- and oil-repellency, and gives good feeling. It is very effective in view of a stainproofing property (soil release property upon washing).

What is claimed is:

1. A surface treatment composition comprising a fluorine-containing-oil-in-water emulsion prepared by emulsifying a fluorine-containing oil which comprises a fluorocarbon, perfluoropolyether or an oligomer of ethylene trifluoride chloride, in water in the presence of a polymeric surfactant of a graft copolymer or block copolymer having a fluorine-containing segment and a hydrophilic segment in a molecule.

2. The surface treatment composition according to claim 1, wherein the fluorine-containing segment in the polymeric surfactant comprises a perfluoropolyether group or a polymeric chain prepared by polymerizing a fluorine-containing monomer having at least one fluorine-containing group selected from the group consisting of a polyfluoroalkyl group, a polyfluoroalkenyl group and a perfluoropolyether group.

3. The surface treatment composition according to claim 1, wherein the hydrophilic segment in the polymeric surfactant comprises a polyalkylene oxide group or a polymeric chain prepared by polymerizing a polyalkylene glycol (meth)acrylate.

4. A textile which is treated with the surface treatment composition according to any one of claims 1 to 3.

5. A fluorine-containing-oil-in-water emulsion prepared by emulsifying a fluorine-containing oil which comprises a fluorocarbon, perfluoropolyether or an oligomer of ethylene trifluoride chloride, in water in the presence of a polymeric surfactant of a graft copolymer or block copolymer having a fluorine-containing segment and a hydrophilic segment in a molecule.

* * * * *